(12) United States Patent
Terasaki et al.

(10) Patent No.: US 10,910,018 B2
(45) Date of Patent: Feb. 2, 2021

(54) DISK DRIVE BASE UNIT WITH ELECTRODEPOSITION COATING FILM COVERING WALL EXCEPT UPPER WALL SURFACE AND ADJACENT INNER SIDE SURFACE

(71) Applicant: Nidec Corporation, Kyoto (JP)

(72) Inventors: Tomonori Terasaki, Kyoto (JP); Tomohiro Yoneda, Kyoto (JP); Junzo Fujinawa, Kyoto (JP); Hirokazu Watanabe, Kyoto (JP); Tadahiro Kuramoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/294,973

(22) Filed: Mar. 7, 2019

(65) Prior Publication Data

US 2019/0287573 A1  Sep. 19, 2019

(30) Foreign Application Priority Data

Mar. 16, 2018  (JP) .................................. 2018-049217

(51) Int. Cl.
*G11B 33/02* (2006.01)
*G11B 33/14* (2006.01)
*G11B 25/04* (2006.01)

(52) U.S. Cl.
CPC .......... *G11B 33/022* (2013.01); *G11B 25/043* (2013.01); *G11B 33/027* (2013.01); *G11B 33/1446* (2013.01); *G11B 33/1466* (2013.01)

(58) Field of Classification Search
None
See application file for complete search history.

(56) References Cited

U.S. PATENT DOCUMENTS

| | | | |
|---|---|---|---|
| 7,957,092 B2 | 6/2011 | Ichikawa et al. | |
| 8,749,914 B2 | 6/2014 | Otake et al. | |
| 9,786,330 B1 * | 10/2017 | Usami et al. ...... | G11B 33/1466 |
| 9,818,453 B1 * | 11/2017 | Lapp et al. ........ | G11B 33/1486 |
| 9,818,454 B1 * | 11/2017 | Albrecht et al. ... | G11B 33/1466 |
| 2006/0138886 A1 * | 6/2006 | Ito et al. ................ | H02K 3/522 |
| | | | 360/99.21 |
| 2008/0150240 A1 * | 6/2008 | Isono et al. ........ | G11B 33/1466 |
| | | | 277/650 |
| 2008/0165448 A1 * | 7/2008 | Ichikawa et al. .. | G11B 33/1466 |
| | | | 360/97.22 |
| 2015/0294691 A1 * | 10/2015 | Inaba et al. ........ | G11B 33/1466 |
| | | | 360/97.12 |

* cited by examiner

*Primary Examiner* — Craig A. Renner
(74) *Attorney, Agent, or Firm* — Keating & Bennett (57) ABSTRACT

A base unit includes a support to support a motor, a bottom plate, and a wall. The bottom plate extends radially outward from the support. The wall extends upward from an outer periphery of the bottom plate, and includes a rectangular opening in planar view. Surfaces of the bottom plate and the wall include a cover surface covered with an electrodeposition coating film and an exposed surface in which a material of the base unit is exposed from the electrodeposition coating film. At least an upper end surface of the wall and a partial region of an inside wall surface of the wall continuous with the upper end surface are each the exposed surface.

4 Claims, 8 Drawing Sheets

DISK DRIVE BASE UNIT WITH ELECTRODEPOSITION COATING FILM COVERING WALL EXCEPT UPPER WALL SURFACE AND ADJACENT INNER SIDE SURFACE

CROSS REFERENCE TO RELATED APPLICATIONS

This application claims the benefit of priority to Japanese Patent Application No. 2018-049217 filed on Mar. 16, 2018. The entire contents of this application are hereby incorporated herein by reference.

BACKGROUND OF THE INVENTION

1. Field of the Invention

The present disclosure relates to a base unit, a disk drive device, a method for manufacturing a base unit, and a method for manufacturing a disk drive device.

2. Description of the Related Art

Conventionally, there is known a disk drive device including a disk, a motor, a head, an actuator assembly, and a casing. Japanese Patent No. 5049017 discloses this kind of disk drive device.

A spindle motor included in the disk drive device of Japanese Patent No. 5049017 rotatingly drives the disk. The head records and reproduces information on the disk. The actuator assembly is provided to move the head in a radial direction of the disk. The casing includes a base including a sidewall, an entire surface of the base being subjected to electrodeposition coating in order to prevent generation of dust, and a first cover joined to the sidewall of the base.

In Japanese Patent No. 5049017, in the technical field of the disk drive device, coating of the electrodeposition coating or the like is burned during the joining due to existence of the electrodeposition coating or the like near the joint portion between the sidewall of the base and the first cover, and a combustion product is caught up in a welded portion, which results in a problem that improper welding is generated.

In order to solve the problem, in the disk drive device described in Japanese Patent No. 5049017, machining is performed on an outer peripheral surface in an upper portion of the sidewall of the base to form the outer peripheral surface as a surface in which the electrodeposition coating and a casting surface are removed. The first cover is substantially the same size as the outer shape of the sidewall of the base, and the entire outer periphery of the first cover is irradiated with a laser beam while a center of a laser spot is controlled, whereby the first cover is joined to an upper surface of the sidewall of the base by laser welding.

However, Japanese Patent No. 5049017 does not disclose the electrodeposition coating on an inner peripheral surface in the upper portion of the sidewall of the base in the disk drive device. In the case that the entire outer periphery of the first cover is irradiated with the laser beam to join the first cover to the sidewall of the base, heat may be conducted to the electrodeposition coating on the inner peripheral surface in the upper portion of the sidewall of the base. In the case that the heat is conducted to the inner peripheral surface in the upper portion of the sidewall of the base, the electrodeposition coating of the corresponding portion is burned to generate the combustion product, and the combustion product scatters in the casing. As a result, there is concern that a degree of cleanliness is decreased in the casing.

SUMMARY OF THE INVENTION

Example embodiments of the present disclosure each prevent generation of a combustion product from an electrodeposition coating film on an inside wall surface of a wall in a housing and scattering of the combustion product into the housing due to the influence of heat during joining and therefore to keep the inside of the housing clean.

An example embodiment of the present disclosure provides a base unit accommodates a disk that rotates around a center axis extending in a vertical direction and a motor that rotates the disk, and defines a housing of a disk drive device by welding a separate lid. The base unit includes a support to support the motor, a bottom plate, and a wall. The bottom plate extends radially outward from the support. The wall extends upward from an outer periphery of the bottom plate, and includes a rectangular opening in planar view. Surfaces of the bottom plate and the wall include a cover surface covered with an electrodeposition coating film and an exposed surface in which a material of the base unit is exposed from the electrodeposition coating film. At least an upper end surface of the wall and a partial region of an inside wall surface of the wall continuous with the upper end surface is the exposed surface.

According to an example embodiment of the present disclosure, the generation of the combustion product from the electrodeposition coating film on the inside wall surface of the wall in the housing and the scattering of the combustion product into the housing due to the influence of heat during the joining is able to be prevented, and therefore the inside of the housing is able to be kept clean.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Hereinafter, example embodiments of the present disclosure will be described with reference to the drawings. In the present disclosure, sometimes a direction parallel to a rotating axis of a disk is referred to as "axial direction", a direction orthogonal to the rotating axis of the disk is referred to as "radial direction", and a direction along a circular arc centered on the rotating axis of the disk is referred to as "circumferential direction". In the present disclosure, sometimes a shape and a positional relationship of each unit are described on the assumption that the axial direction is a vertical direction and that a side on which a cover is attached to a base member is as an upper side. However, the above definition of the vertical direction is not intended to restrict in any way orientations of a base unit and a disk drive device according to the present disclosure when in use.

Figure 1:
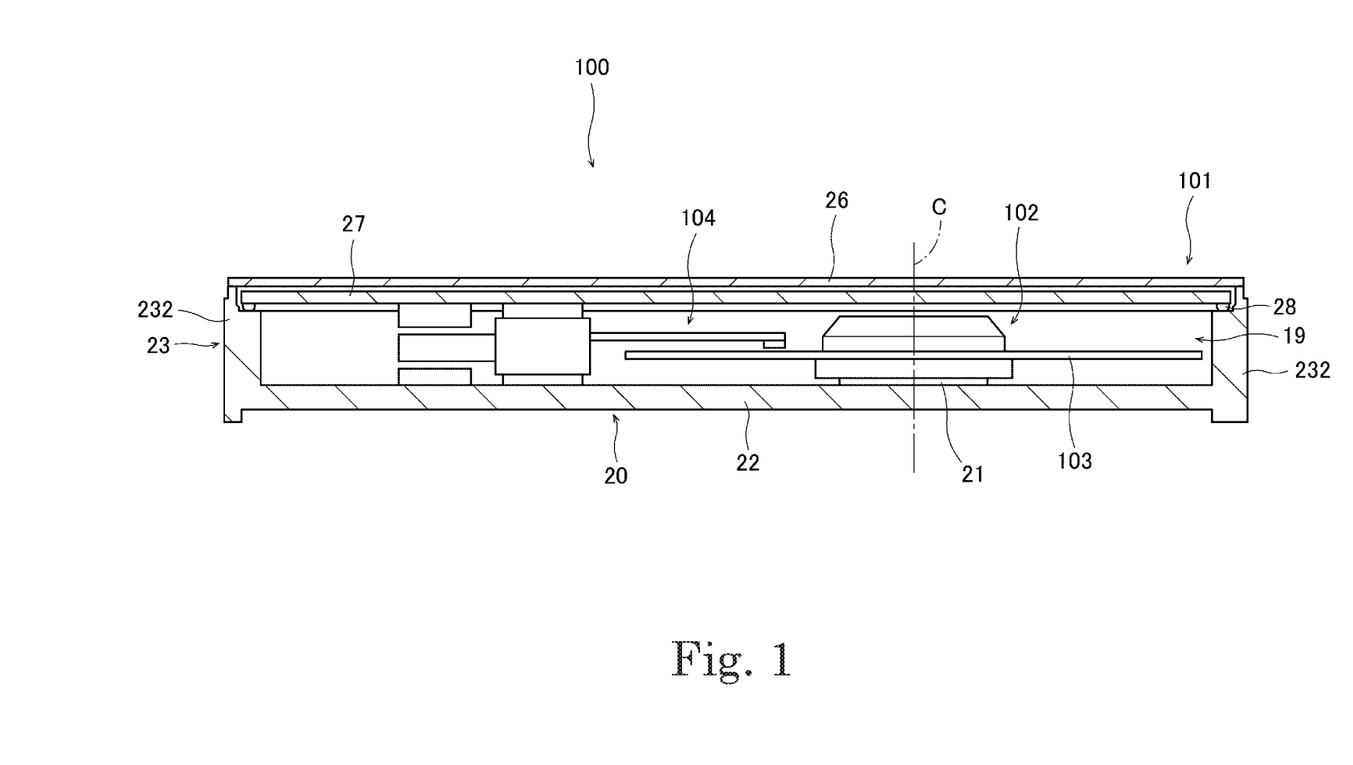
FIG. 1 is a longitudinal sectional view illustrating a schematic configuration of a disk drive device according to a first example embodiment of the present disclosure.

FIG. 1 is a sectional view illustrating a schematic configuration of a disk drive device 100 according to a first embodiment. The disk drive device 100 is a hard disk drive. The disk drive device 100 includes a housing 101, a motor 102, a disk 103, an access unit 104, and a support 21. The motor 102, the disk 103, and the access unit 104 are accommodated in the housing 101.

The motor 102 is supported by a base unit 20 included in the housing 101. The motor 102 holds the disk 103, and rotatingly drives the disk 103 around a center axis C. The motor 102 is supported by the support 21 provided on a bottom plate 22 (to be described later) of the housing 101. The disk 103 is a medium on which information is recorded. The access unit 104 comes close to or separates from a surface of the disk 103 to magnetically perform at least one of reading of information recorded on the disk 103 and writing of information in the disk 103.

As illustrated in FIG. 1, the housing 101 includes the base unit 20, a first lid 26, a second lid 27, and a seal member 28. The housing 101 constitutes a casing that accommodates the motor 102, the disk 103, and the access unit 104 as a whole.

Figure 2:
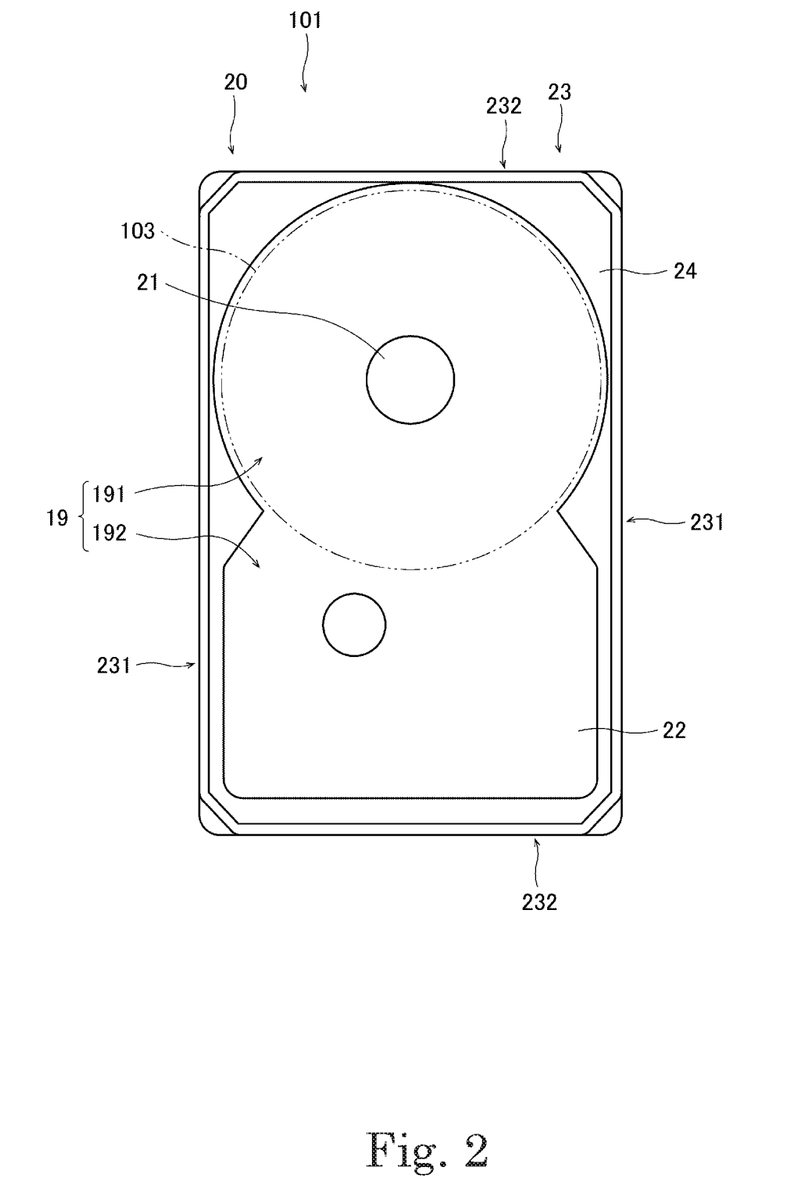
FIG. 2 is a plan view of a base unit of the first example embodiment of the present disclosure.

The base unit 20 is a structure that supports the motor 102, the disk 103, and the access unit 104. FIG. 2 illustrates a plan view of the base unit 20. As illustrated in FIGS. 1 and 2, the base unit 20 has the support 21, a bottom plate 22, a wall 23, and a support surface 24.

The support 21 is a tubular or columnar region extending in the vertical direction, and supports the motor 102. The bottom plate 22 spreads radially outward from the support 21 in a planar shape. As illustrated in FIG. 2, the bottom plate 22 has a rectangular shape in planar view. The wall 23 extends upward from an outer periphery of the bottom plate 22, and forms an opening having a rectangular shape in planar view.

The wall 23 includes a pair of long-side walls 231 corresponding to a long side of the rectangular opening and a pair of short-side walls 232 corresponding to a short side shorter than the long side of the rectangular opening. As illustrated in FIG. 2, the base unit 20 has a first space 19 surrounded by the bottom plate 22 and the wall 23. The first space 19 includes a motor accommodating unit 191 and an access-unit accommodating unit 192. The support 21 is provided in the motor accommodating unit 191, and the motor accommodating unit 191 accommodates the motor 102 and the disk 103. The access unit 104 is accommodated in the access-unit accommodating unit 192.

Figure 3:
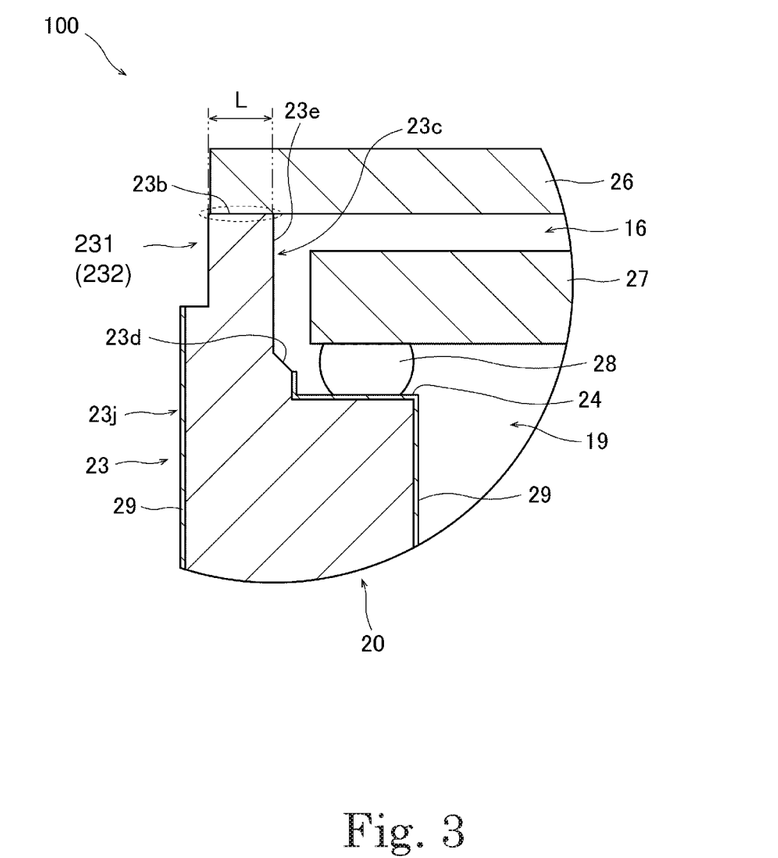
FIG. 3 is a sectional view illustrating a vicinity of an upper end surface of a wall in the base unit of the first example embodiment of the present disclosure.

As illustrated in FIG. 3, the surfaces of the bottom plate 22 and the wall 23 include a cover surface (coating surface) covered with an electrodeposition coating film 29 and an exposed surface in which a material (metal material) forming the base unit 20 is exposed from the electrodeposition coating film 29. The cover surface is provided to prevent dust such as particles from being generated from the material forming the base unit 20. By providing the cover surface, the dust is prevented from scattering into the housing 101, and the interior of the housing 101 is kept clean. The exposed surface is provided by, for example, cutting, only in a place where it is undesirable to be covered with the cover surface due to various circumstances.

The base unit 20 of the first embodiment is manufactured by molding (casting) an aluminum alloy material using a pair of dies. Thus, the exposed surface of the first embodiment is a surface, which is not covered with the electrodeposition coating film 29 but in which the aluminum alloy material is exposed. However, the surface of the exposed surface may be covered with an impregnant that improves airtightness.

As illustrated in FIGS. 2 and 3, the base unit 20 includes the support surface 24 on the outer periphery of the bottom plate 22 in planar view. The support surface 24 spreads in a direction perpendicular to the axial direction at a position above the upper surface of a portion except for the outer periphery of the bottom plate 22 and below an upper end face of the wall 23. The support surface 24 is annularly provided along an inside surface of the wall 23.

The first lid 26 is a flat plate-shaped member having substantially the same size and shape as an outer shape of the wall 23 in planar view. The first lid 26 is provided separately from the base unit 20. The first lid 26 is superimposed on the upper end face of the wall 23 such that the outer shapes of the first lid 26 and the wall 23 are matched with each other. The first lid 26 is welded (joined) to the wall 23 by irradiation of a laser beam between an outside edge of the upper end face of the wall 23 and the first lid 26.

The second lid 27 is a flat plate-shaped member having a size and shape in which the outer shape of the wall 23 is slightly reduced in planar view. The second lid 27 is provided separately from the base unit 20 and the first lid 26. The second lid 27 is disposed below the first lid 26 and inside the wall 23. The second lid 27 is fixed to the support surface 24 of the base unit 20 using a fastening member (not illustrated). More specifically, the second lid 27 is screwed to the support surface 24 while the seal member 28 is interposed therebetween. For example, an annular gasket made of a highly airtight resin can be used as the seal member 28.

A combination of the first lid 26 and the second lid 27 constitutes a lid in the first embodiment. An internal space of the housing 101 is partitioned by the second lid 27 into the first space 19 and a second space 16 located between the first lid 26 and the second lid 27. The rectangular opening of the wall 23 of the housing 101 is doubly closed by the first lid 26 and the second lid 27 so that the airtightness inside the housing 101 is kept. In particular, the airtightness of the first space 19 is kept high by providing the seal member 28. For example, the internal space of the housing 101 may be filled with a helium gas that is gas having lower density than air. However, the present disclosure is not limited to this configuration, and the internal space of the housing 101 may be filled with hydrogen gas, air, or the like.

As described above, the first lid 26 is superimposed on an upper end face 23b of the wall 23, and a gap between the outside edge of the upper end face 23b of the wall 23 and the first lid 26 is irradiated with the laser beam over the entire periphery, whereby the first lid 26 is welded to the wall 23.

The welded place is schematically indicated by a broken line in FIG. 3. Similarly, for the drawings from FIG. 5, the welded portions are indicated by the broken line. As described above, in welding the first lid 26 to the upper end face 23b of the wall 23 of the base unit 20, the outside edge of the upper end face 23b of the wall 23 reaches extremely high temperature because the aluminum alloy at the outside edge is melted. In this case, high-temperature heat may be also conducted to the inside wall surface in an upper portion of the wall 23. In the case that the high-temperature heat caused by the welding is conducted to the inside wall surface in the upper portion of the wall 23, a combustion product is generated from the electrodeposition coating film on the inside wall surface, and the combustion product is scattered in the housing 101. On the other hand, in the disk drive device 100 of the first embodiment, the upper end face 23b of the wall 23 and a partial region of the inside wall surface of the wall 23 continuous with the upper end face 23b are used as the exposed surface in order to solve the problem.

A surface configuration of the wall 23 of the first embodiment will more specifically be described below with reference to FIG. 3. FIG. 3 is a longitudinal sectional view illustrating a vicinity of the upper end face 23b of the wall 23 in the base unit 20 of the disk drive device 100 of the first embodiment.

As illustrated in FIG. 3, the upper end face 23b of the wall 23 and the partial region of the inside wall surface of the wall 23 continuous with the upper end face 23b are the exposed surface. In other words, in the surface of the wall 23, the upper end face 23b and a partial region adjacent to the rectangular opening of the inside wall surface of the wall 23 are the exposed surface. Hereinafter, the partial region of the inside wall surface of the wall 23 is referred to as an "exposed region 23c".

The exposed region 23c extends downward from the opening, and reaches a height position of the seal member 28. In other words, the electrodeposition coating film (cover surface) 29 spreads from the lower end of the inside wall surface of the wall 23 to the height of the seal member 28. However, distribution of the exposed region 23c and the electrodeposition coating film 29 is not limited to this configuration. For example, the upper end of the electrodeposition coating film 29 may be located above the height position of the seal member 28.

The exposed region 23c of the first embodiment includes a stepped surface 23d. The stepped surface 23d is disposed below the upper end face 23b on a radial inside of the upper end face 23b of the wall 23, and spreads obliquely in the axial direction. The stepped surface 23d, the upper end face 23b, and a peripheral surface 23e connecting the stepped surface 23d and the upper end face 23b are formed on the inside wall surface of the wall 23 by, for example, publicly known cutting using a lathe.

As described above, in the first embodiment, the exposed region 23c that is not covered with the electrodeposition coating film 29 is formed on the inside wall surface in the upper portion of the wall 23. With this configuration, even if the high-temperature heat is transferred to the inside wall surface in the upper portion of the wall 23 during the welding of the wall 23 and the first lid 26, because the electrodeposition coating film 29 does not exist in the exposed region 23c, the combustion product is not generated. Thus, it is possible to suppress the problem in that the combustion product is generated from the electrodeposition coating film 29 due to an influence of heat during the welding and contaminates the inside of the housing 101.

Figure 4:
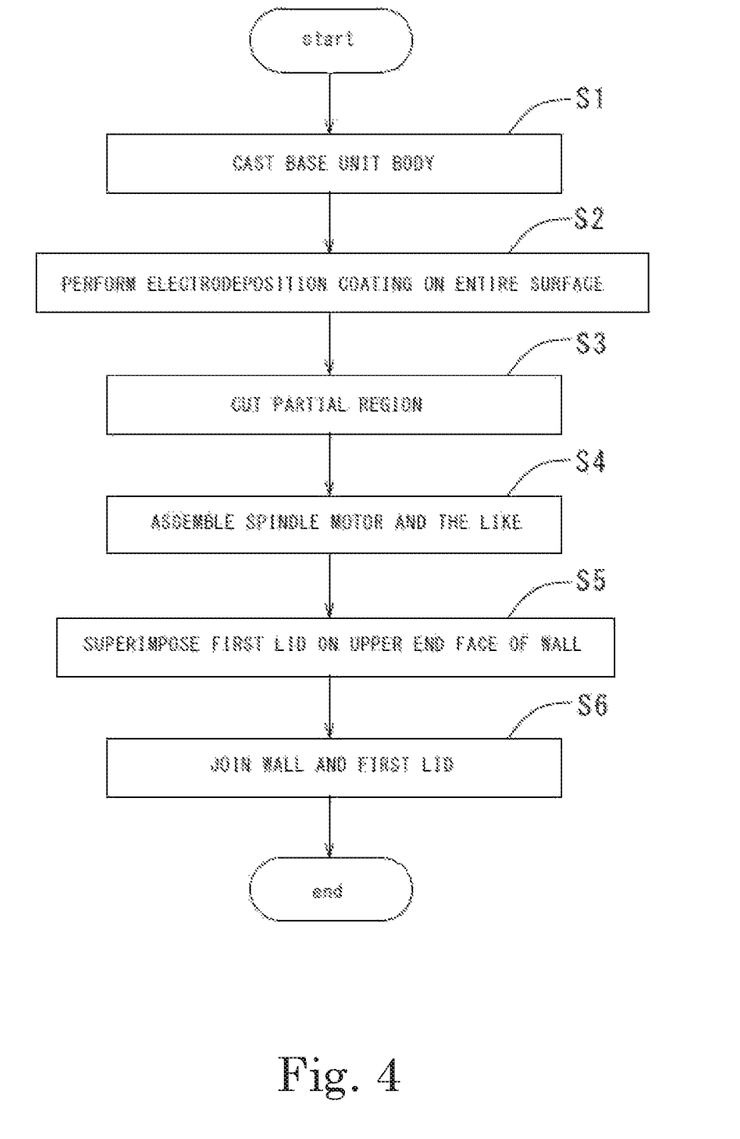
FIG. 4 is a flowchart illustrating a method for manufacturing the disk drive device of the first example embodiment of the present disclosure.

A process of manufacturing the base unit 20 of the first embodiment and the disk drive device 100 including the base unit 20 will briefly be described below with reference to FIG. 4. FIG. 4 is a flowchart illustrating a process of manufacturing the disk drive device 100.

After a molten aluminum alloy is supplied (injected) between a pair of dies, the aluminum alloy is cooled and solidified to form a base unit body that is a cast (step S1). The base unit body is subjected to electrodeposition coating, cutting work, or the like in a post-process, thereby becoming the base unit 20 as a finished product.

The entire surface of the base unit body is subjected to the electrodeposition coating (step S2). Specifically, for example, the base unit body is immersed in a coating material of an epoxy-based resin, and current is passed between the coating material and the base unit body to cause the coating material to adhere to the entire surface of the base unit body. Consequently, the surface of the base unit body is coated with the electrodeposition coating film 29.

Subsequently, a partial region of the base unit body is cut (step S3). Specifically, the electrodeposition coating film 29 and the casting surface of the aluminum alloy are partially removed from the upper end face 23b of the wall 23 and the exposed region 23c by cutting the upper end face 23b of the wall 23 of the base unit body and the partial region of the inside wall surface continuous with the upper end face 23b. In more particular, the outside side surface of the upper end of the wall 23 is also cut in addition to the upper end face 23b and the exposed region (partial region) 23c of the base unit body (base unit 20). Consequently, as illustrated in FIG. 3, the electrodeposition coating film does not exist also on the outside side surface in the vicinity of the outside edge (welded portion) of the wall 23. In this way, the base unit 20 is finished.

After the base unit 20 is finished in step S3, the motor 102, the disk 103, the access unit 104, the seal member 28, and the second lid 27 are assembled in the base unit 20 (step S4). That is, each member accommodated in the housing 101 is assembled on the side of the base unit 20.

Subsequently, the first lid 26 is superimposed on the upper end face 23b of the wall 23 of the base unit 20 such that the outer shapes of the first lid 26 and the upper end face 23b are matched with each other (step S5).

The gap between the outside edge of the upper end face 23b of the wall 23 and the first lid 26 is irradiated with the laser beam (step S6). The laser light irradiation is performed over the entire periphery of the wall 23. Consequently, the first lid 26 is welded (joined) to the wall 23.

In step S6, temperature in the vicinity of the outside edge of the wall 23 of the base unit 20 is raised to temperature at which the aluminum alloy is melted. As described above, there is a possibility that the heat at this time is also transmitted to the inside wall surface of the wall 23 of the base unit 20. In the method for manufacturing the disk drive device 100 of the first embodiment, as illustrated in FIG. 3, the electrodeposition coating film 29 disposed relatively close to the welded portion is previously removed in the process of step S3. Thus, even if the high-temperature heat is transmitted to the inside wall surface of the wall 23 of the base unit 20 during the welding, the problem in that the combustion product is generated from electrodeposition coating is hardly caused.

As described above, in the base unit 20 of the first embodiment, at least the upper end face 23b of the wall 23 and the exposed region (partial region) 23c of the inside wall surface of the wall 23 continuous with the upper end face 23b are used as the exposed surface. This configuration is advantageous in the following points. That is, in the case that the base unit 20 is completed as the disk drive device 100, the first lid 26 is superimposed on the upper end face 23*b* of the wall 23 (step S5), and the outside edge is welded between the upper end face 23*b* of the wall 23 and the first lid 26 (step S6). In the welding, the heat may be also conducted to the partial region of the inside wall surface of the wall 23 continuous with the upper end face 23*b* of the wall 23, but the partial region is not covered with the electrodeposition coating film 29. Thus, the combustion product can be prevented from being generated from the electrodeposition coating film 29 on the inside wall surface of the wall 23 and from scattering into the housing 101 due to the influence of the heat during the welding. As a result, the inside of the housing 101 can be kept clean.

In the base unit 20 of the first embodiment, the wall 23 is disposed below the upper end face 23*b* on the inside with respect to the upper end face 23*b*, and includes the stepped surface 23*d* spreading obliquely in the axial direction. The stepped surface 23*d* is the exposed surface. Consequently, for example, after the electrodeposition coating film 29 is formed on the entire surface of the housing 101 (step S2), the stepped surface 23*d* can be formed on the inside wall surface of the wall 23 of the housing 101 as the exposed surface by simple cutting (step S3).

In the base unit 20 of the first embodiment, the internal space of the housing 101 is partitioned into the first space 19 and the second space 16 by the second lid 27. The disk 103, the motor 102, and the access unit 104 are disposed in the first space 19. The seal member 28 is interposed between the second lid 27 and the wall 23 and below the second lid 27. In the inside wall surface of the wall 23, the upper end of the electrodeposition coating film (cover surface) 29 is located at the position equal to or higher than the position of the seal member 28 in the axial direction. Even if aluminum alloy particles are generated from the exposed surface of the inside wall surface of the wall 23 of the housing 101, the particles are blocked by the seal member 28, so that the particles hardly enter the first space 19 in which the disk 103 and the like are disposed. Thus, a degree of cleanliness can be kept in the first space 19.

Figure 5:
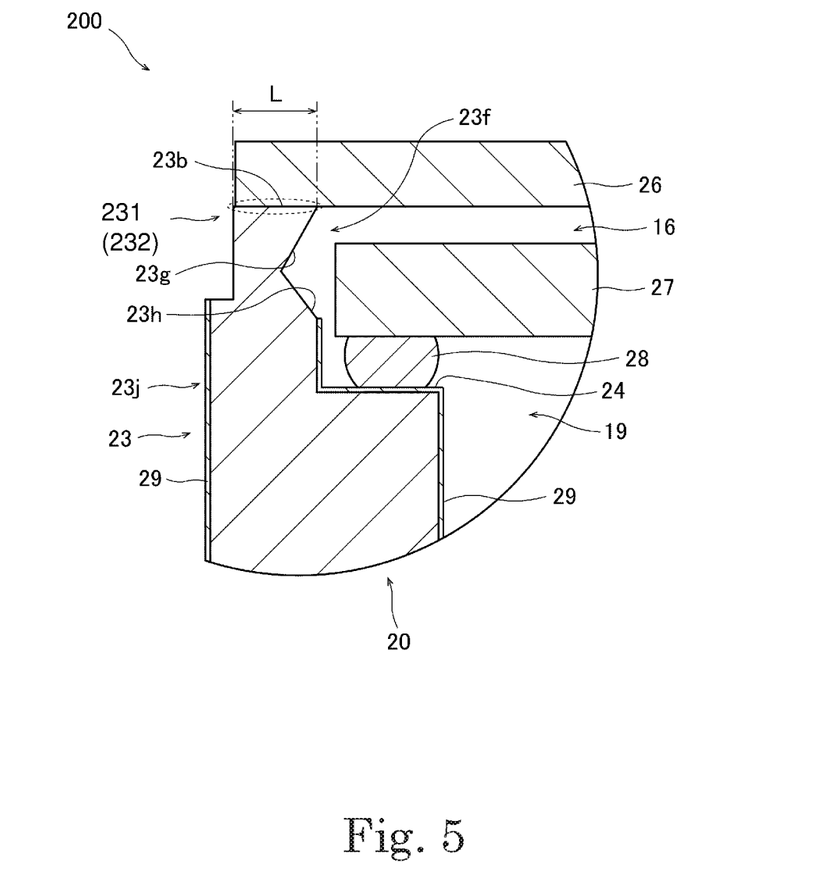
FIG. 5 is a sectional view illustrating a vicinity of an upper end surface of a wall in a base unit according to a second example embodiment of the present disclosure.

The surface configuration of the wall 23 according to a second embodiment will be described below with reference to FIG. 5. FIG. 5 is a longitudinal sectional view illustrating the vicinity of the upper end face of the wall 23 in a base unit 20 of a disk drive device 200 of the second embodiment. In the following description, the same reference numeral will be given to the member having the same configuration and function as the first embodiment, and the overlapping description will occasionally be omitted.

As illustrated in FIG. 5, also in the second embodiment, the upper end face 23*b* of the wall 23 and an exposed region (partial region) 23*f* of the inside wall surface of the wall 23 continuous with the upper end face 23*b* are the exposed surface. That is, the base unit 20 of the second embodiment includes the exposed region 23*f* instead of the exposed region 23*c* of the first embodiment.

The exposed region 23*f* extends downward from the rectangular opening, and reaches the height position of the second lid 27. In other words, the upper end of the electrodeposition coating film (cover surface) 29 is disposed at the height position of the second lid 27. However, distribution of the exposed region 23*c* and the electrodeposition coating film 29 is not limited to this configuration. For example, the upper end of the electrodeposition coating film 29 may be located above the height position of the second lid 27.

The exposed region 23*f* of the second embodiment includes a first inclined surface 23*g* and a second inclined surface 23*h*. The first inclined surface 23*g* is a tapered surface that gradually approaches an outside wall surface 23*j* of the wall 23 as it goes downward from the upper end face 23*b*. The second inclined surface 23*h* is a tapered surface that gradually moves away from the outside wall surface 23*j* of the wall 23 as it goes further downward from the lower end of the first inclined surface 23*g*. The first inclined surface 23*g* and the second inclined surface 23*h* are formed on the inside wall surface of the wall 23 by cutting. The first inclined surface 23*g* and the second inclined surface 23*h* are used as the exposed surface by cutting the inside wall surface of the wall 23 of the base unit body.

In the configuration of the second embodiment, for example, after the electrodeposition coating film 29 is formed on the entire surface of the base unit body, the electrodeposition coating film 29 is cut into a wedge shape in section by cutting of a publicly known method, which allows the first inclined surface 23*g* and the second inclined surface 23*h* to be formed as the exposed surface. In this case, a thickness L of the upper end face 23*b* of the wall 23 can relatively largely be secured even if a wall thickness of a part of the wall 23 is reduced by cutting. Thus, a possibility that the influence of the heat during the welding to the first lid 26 reaches the cover surface of the inside wall surface of the wall 23 of the housing 101 can further be reduced.

In the base unit 20 of the second embodiment, in the inside wall surface of the wall 23, the upper end of the electrodeposition coating film (cover surface) 29 is located at the position equal to or higher than the position of the second lid 27 in the axial direction. Even if aluminum alloy particles are generated from the exposed region 23*f* of the inside wall surface of the wall 23 in the housing 101, the particles are blocked by both the second lid 27 and the seal member 28, whereby the particles do not enter the first space 19 where the disk 103 and the like are disposed. Thus, the degree of cleanliness in the first space 19 can be kept higher.

Figure 6:
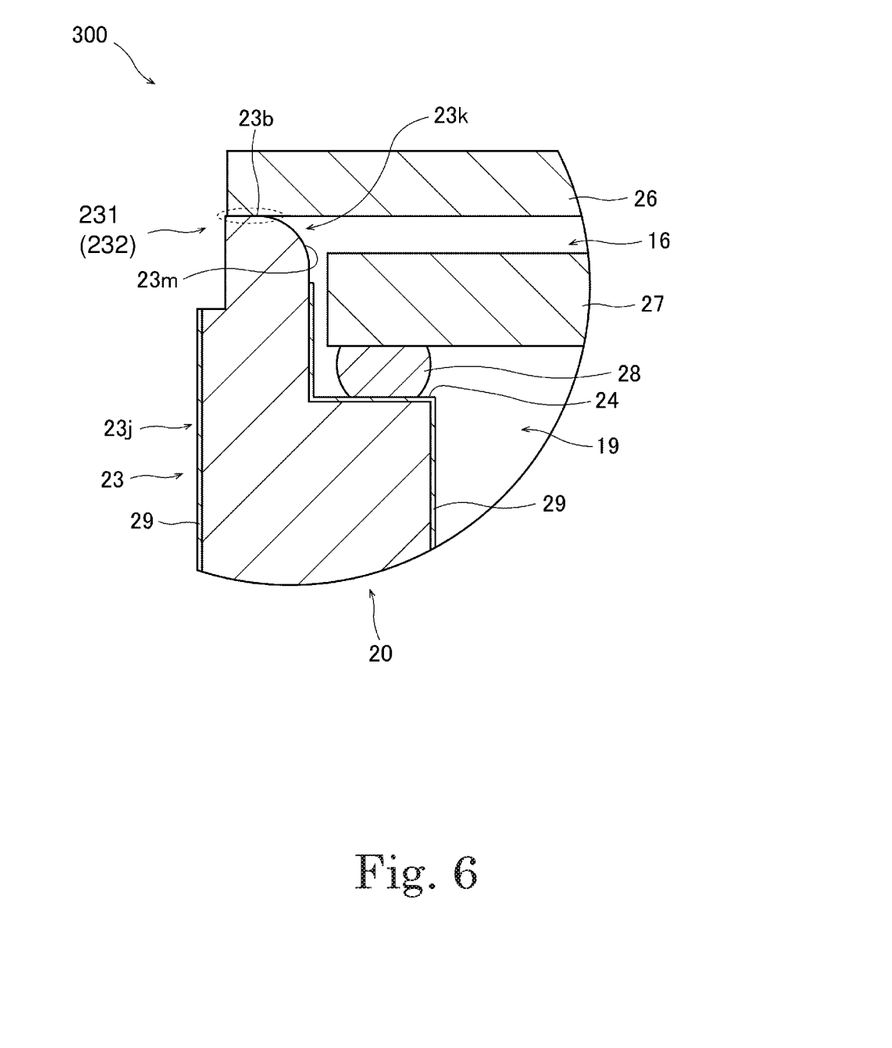
FIG. 6 is a sectional view illustrating a vicinity of an upper end surface of a wall in a base unit according to a third example embodiment of the present disclosure.

The configuration of the surface of the wall 23 according to a third embodiment will be described below with reference to FIG. 6. FIG. 6 is a longitudinal sectional view illustrating the vicinity of the upper end face 23*b* of the wall 23 in the base unit 20 of a disk drive device 300 of the third embodiment.

As illustrated in FIG. 6, also in the third embodiment, the upper end face 23*b* of the wall 23 and an exposed region (partial region) 23*k* of the inside wall surface of the wall 23 continuous with the upper end face 23*b* are the exposed surface. That is, the base unit 20 of the third embodiment includes the exposed region 23*k* instead of the exposed region 23*c* of the first embodiment.

The exposed region 23*k* spreads inward and downward from the inside edge of the upper end face 23*b* of the wall 23, and includes a convex curved surface 23*m* that gradually moves away from the outside wall surface 23*j* of the wall 23 as it goes downward. The upper end face 23*b* and the curved surface 23*m* are formed at the upper end of the wall 23 by a series of cutting processes. The upper end face 23*b* and the curved surface 23*m* are formed as the exposed surface by cutting the upper end of the wall 23 of the base unit body.

In the configuration of the third embodiment, for example, after the electrodeposition coating film 29 is formed over the entire surface of the base unit body, the machining can effectively be performed by a series of cutting work that is performed while a cutting blade is applied with its angle changed such that the upper end face 23*b* and the curved surface 23*m* of the wall 23 become the exposed surfaces.

Thus, man-hour of machining performed for the formation of the partial region (exposed region) can be reduced.

Figure 7:
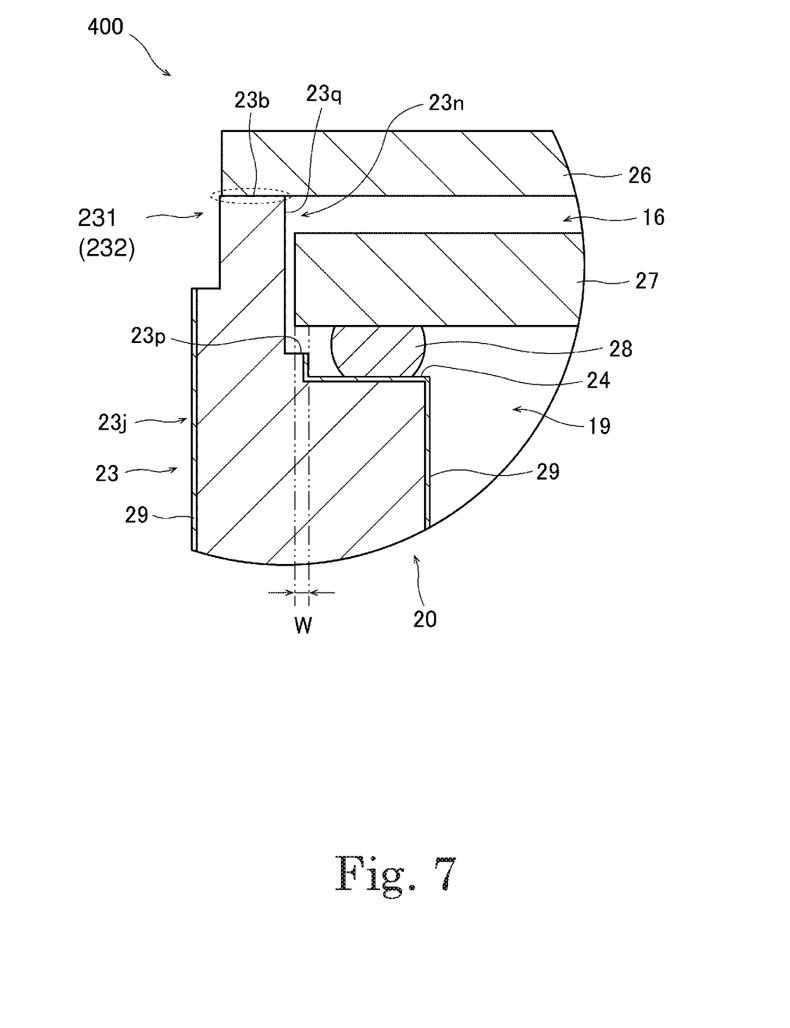
FIG. 7 is a sectional view illustrating a vicinity of an upper end surface of a wall in a base unit according to a fourth example embodiment of the present disclosure.

The configuration of the surface of the wall 23 according to a fourth embodiment will be described below with reference to FIG. 7. FIG. 7 is a longitudinal sectional view illustrating the vicinity of the upper end face 23b of the wall 23 in the base unit 20 of a disk drive device 400 of the fourth embodiment.

As illustrated in FIG. 7, also in the fourth embodiment, the upper end face 23b of the wall 23 and an exposed region (partial region) 23n of the inside wall surface of the wall 23 continuous with the upper end face 23b are the exposed surface. That is, the base unit 20 of the fourth embodiment includes the exposed region 23n instead of the exposed region 23c of the first embodiment.

The exposed region 23n includes a stepped surface 23p. The stepped surface 23p is disposed below the upper end face 23b on the inside with respect to the upper end face 23b of the wall 23, and spreads perpendicular to the axial direction. In the fourth embodiment, the stepped surface 23p and a peripheral surface 23q connecting the stepped surface 23p and the upper end face 23b are formed as the exposed surface by cutting the wall 23 of the base unit body. As illustrated in FIG. 7, the stepped surface 23p and the second lid 27 overlap each other by a predetermined amount W when viewed in the axial direction. In other words, the stepped surface 23p and the second lid 27 partly overlap each other when viewed in the axial direction.

In the configuration of the fourth embodiment, the outer periphery of the second lid 27 can be disposed in a groove-shaped space formed by cutting the inside wall surface of the wall 23 of the base unit body, and an economic layout in which the groove-shaped space is effectively used can be achieved. The degree of cleanliness in the region where the disk 103 and the like are disposed can be kept higher in the housing 101. More specifically, a gap between the peripheral surface of the second lid 27 and the peripheral surface 23q is small, so that a possibility that particles enter the side of the first space 19 through the gap can be suppressed low even if the particles are generated from the peripheral surface 23q.

Figure 8:
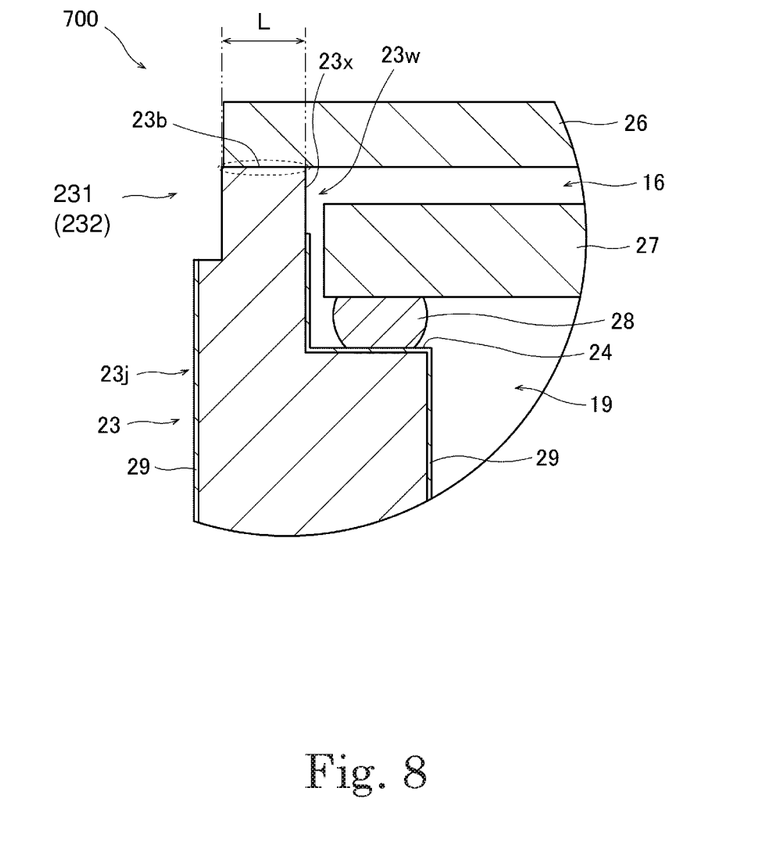
FIG. 8 is a sectional view illustrating a vicinity of an upper end surface of a wall in a base unit according to a modification of an example embodiment of the present disclosure.

Subsequently, the configuration of the surface of the wall 23 according to a modification will be briefly described below with reference to FIG. 8. FIG. 8 is a longitudinal sectional view illustrating the vicinity of the upper end face 23b of the wall 23 in the base unit 20 of a disk drive device 700 of the modification.

An exposed region 23w of the modification includes a peripheral surface 23x that is a curved surface perpendicular to the radial direction. The peripheral surface 23x of the modification is different from those of the above embodiments in that the peripheral surface 23x is formed as the exposed surface by a method except for cutting. Specifically, in manufacturing the base unit 20 of the modification, the surface of the base unit body is subjected to electrodeposition coating while the region corresponding to the peripheral surface 23x is masked in step S2. In step S3 subsequent to step S2, the region corresponding to the peripheral surface 23x is not cut. Thus, in the modification, the cover surface covered with the electrodeposition coating film 29 on the inside wall surface of the wall 23 is substantially flush with the peripheral surface 23x.

In the configuration of the modification, the thickness L at the upper end of the wall 23 can be secured as largely as possible. Thus, the possibility that the influence of the heat during the welding reaches the electrodeposition coating film 29 on the inside wall surface of the wall 23 can be reduced largely.

While the embodiments and the modification of the present disclosure have been described above, the present disclosure is not limited to the embodiments, and various changes can be made without departing from the spirit of the present disclosure.

In the above embodiments, by way of example, the exposed region includes one stepped surface spreading perpendicular or oblique to the axial direction. However, the present disclosure is not limited to this configuration. That is, at least two stepped surfaces may be included in the exposed region.

In the third embodiment, the curved surface 23m included in the exposed region is the convex curved surface. Alternatively, for example, a concave curved surface may be used instead of the convex curved surface.

The second lid 27 and the seal member 28 may be omitted.

In the first embodiment, the stepped surface 23d may be a surface spreading perpendicular to the axial direction. In the fourth embodiment, the stepped surface 23p may be an inclined surface spreading obliquely to the axial direction.

Each element appearing in the embodiments and the modification may appropriately be combined within a range in which inconsistency is not generated.

The present disclosure can be used in a base unit, a disk drive device, a method for manufacturing a base unit, and a method for manufacturing a disk drive device.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit to accommodate a disk that rotates around a center axis extending in a vertical direction and a motor that rotates the disk, the base unit defining a housing of a disk drive device by welding a separate lid, the base unit comprising:
    a support to support the motor;
    a bottom plate extending radially outward from the support; and
    a wall extending upward from an outer periphery of the bottom plate and including a rectangular opening in planar view; wherein
    surfaces of the bottom plate and the wall include:
        a cover surface covered with an electrodeposition coating film; and
        an exposed surface in which a material of the base unit is exposed from the electrodeposition coating film; and
        at least an upper end surface of the wall and a partial region of an inside wall surface of the wall continuous with the upper end surface is the exposed surface; and
    the wall includes a support surface and a stepped surface, an upper end of the cover surface is located on the inside wall surface at a position in an axial direction equal to or higher than the support surface and extends to a position adjacent to the stepped surface.

2. The base unit according to claim 1, wherein the inside wall surface of the wall includes the stepped surface extending perpendicular or oblique to the axial direction; and
the stepped surface is the exposed surface.

3. A disk drive device comprising the base unit according to claim 1; wherein
the lid includes:
a first lid that overlaps the wall and is welded to an outside edge of the upper end surface of the wall; and
a second lid that is below the first lid and inside of the wall, an internal space of the base unit is partitioned by the second lid into a first space and a second space;
the disk, the motor, and an access unit that performs at least of reading and writing of information from and to the disk are housed in the first space;
the second space is located between the first lid and the second lid;
the second lid is supported by the support surface; and
a seal is interposed between the second lid and the wall and disposed below the second lid.

4. The disk drive device according to claim 3, wherein the stepped surface is the exposed surface; and
the stepped surface and the second lid partially overlap each other when viewed in the axial direction.

* * * * *